(No Model.)
O. R. DECKER.
WATCH BOW FASTENER.
No. 426,927. Patented Apr. 29, 1890.
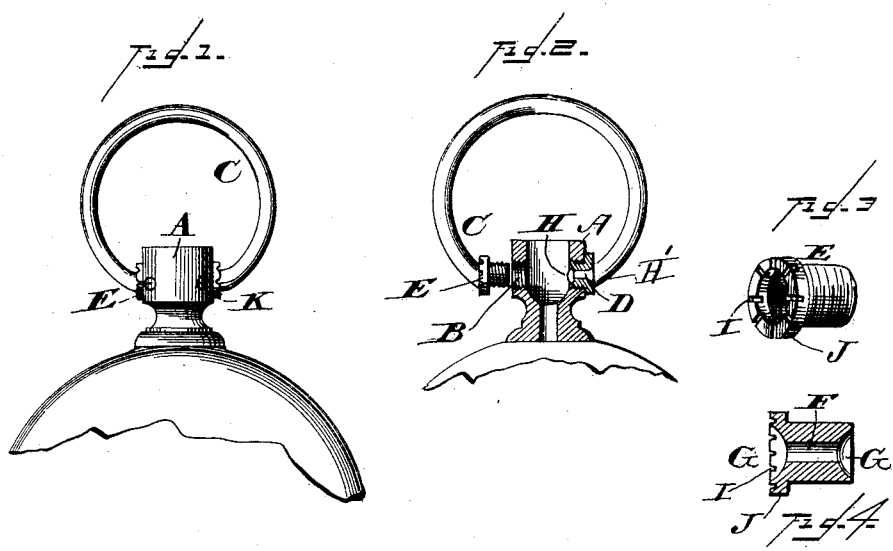
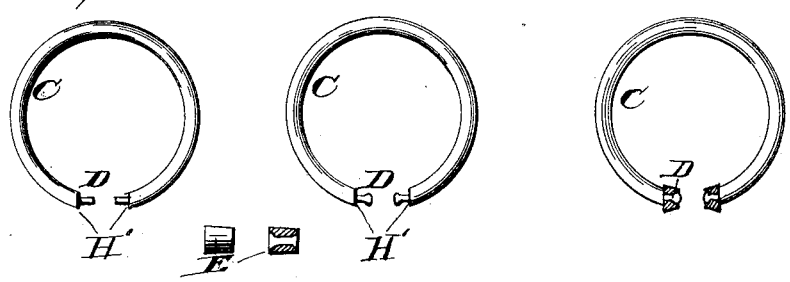
WITNESSES
F. L. Ourand
Cary S. Fry
Oscar R. Decker
INVENTOR
By W. S. Fitzgerald
Attorney

UNITED STATES PATENT OFFICE.

OSCAR R. DECKER, OF ROCHESTER, INDIANA.

WATCH-BOW FASTENER.

SPECIFICATION forming part of Letters Patent No. 426,927, dated April 29, 1890.

Application filed June 11, 1889. Serial No. 313,889. (No model.)

*To all whom it may concern:*

Be it known that I, OSCAR R. DECKER, a citizen of the United States, residing at Rochester, in the county of Fulton and State of Indiana, have invented certain new and useful Improvements in Pendants and Pendant-Rings; and I do hereby declare the following to be a full, clear, and exact description of the invention, such as will enable others skilled in the art to which it appertains to make and use the same.

My invention relates to improvements in watch-pendants; and it aims to so improve the construction of this class of devices that the ring can be easily removed from the pendant, when so desired, for repairs, and yet will be securely held therein against accidental displacement.

The invention consists in certain novel features hereinafter described and claimed.

In the accompanying drawings, which fully illustrate my invention, Figure 1 is a side view of a watch-pendant provided with my improvement. Fig. 2 is a longitudinal section of the same. Fig. 3 is a detail perspective view of the bushing, and Fig. 4 is a longitudinal section of the same. Figs. 5 and 6 are modified forms of the invention.

The pendant A is of the usual size and shape, and is provided near its outer end with the diametrical openings B, which are arranged at diametrically-opposite points. The ends of the ring C are constructed with the reduced portions or stems D, which are swiveled in the said openings B.

In the preferred form of my invention the openings B are provided with internal screw-threads, and the bushings E are provided with external screw-threads which engage the said internal threads of the openings B, whereby the bushings are secured in position. The bushings are provided their entire length with cylindrical holes F, the internal ends of which are enlarged, as shown at G G. The stems D of the ring are inserted through the holes F, and their extremities are then upset into the enlarged ends of the holes, thereby forming the heads H and swiveling the bushings on the stems or ends of the ring between the heads H and the shoulders H' on the ring. The bushings are then secured in the openings in the pendant, so as to swivel the ring thereto, and in order that the bushing may be easily driven home I form on the outer end of the same the collar or annular flange J, having a series of radial notches or recesses I, which are adapted to be engaged by a suitably-shaped wrench, as will be readily understood.

It will be seen from the foregoing description that I have provided a device in which the ring will be efficiently swiveled to the pendant, so as to have the desired movement. The heads H prevent the ring becoming disengaged from the bushings, while the screw-threads hold the bushings securely in the pendant. Should the ring be broken or it be necessary to remove the same for any other reason, the bushings are removed by a suitable wrench, thereby withdrawing the ends of the ring. By employing a bushing the ring is not only swiveled to the pendant so as to be easily removed, but the durability of the pendant is increased as the wear is received by the bushing instead of the pendant, as heretofore.

In Fig. 1 I have shown set-screws K inserted through the pendant and bearing on the bushing to secure the same; but these set-screws may or may not be used, as desired.

In Fig. 6 the bushing is shown as having a smooth surface and tapered slightly. In this form the bushing will be wedged into the opening in the pendant, and, if so desired, the set-screws may be used for further security.

My device is very simple, and its advantages are thought to be obvious from the foregoing description, taken in connection with the accompanying drawings.

Having thus described my invention, I claim—

In a watch-pendant mechanism, the combination, with hollow pendant A, provided with the diametrical transverse threaded opening B, of the ring C, having the stems D and the enlarged heads H and shoulders H', the hollow threaded bushings E, provided with enlarged end openings G, surrounding the stems D and inclosed between the heads H and shoulders H' and adapted to enter the diametrical threaded openings B, all substantially as set forth.

In testimony whereof I affix my signature in presence of three witnesses.

OSCAR R. DECKER.

Witnesses:
M. A. BAKER,
JOS. F. AULT,
JULIUS ROWLEY.